United States Patent
Goldschmid et al.

(10) Patent No.: US 6,709,722 B2
(45) Date of Patent: Mar. 23, 2004

(54) METHOD FOR PRODUCING DECORATIVE PANELS FOR USE IN VEHICLE INTERIORS, AND DECORATIVE PANEL

(75) Inventors: Matthias Goldschmid, Ostfildern (DE); Thomas Hoffman, Bruchsal (DE)

(73) Assignee: Holzindustrie Bruchsal GmbH & Co. KG, Bruchsal (DE)

( * ) Notice: Subject to any disclaimer, the term of this patent is extended or adjusted under 35 U.S.C. 154(b) by 96 days.

(21) Appl. No.: 09/852,680

(22) Filed: May 11, 2001

(65) Prior Publication Data

US 2001/0039996 A1 Nov. 15, 2001

(30) Foreign Application Priority Data

May 11, 2000 (DE) .......................................... 100 22 905
Mar. 3, 2001 (DE) .......................................... 101 10 396

(51) Int. Cl.[7] ................................................. A01N 3/00
(52) U.S. Cl. ......................... 428/22; 428/24; 428/511; 428/913.3; 156/57

(58) Field of Search ....................... 156/57, 61; 428/17, 428/22, 24, 481, 511, 913.3; 427/4

(56) References Cited

FOREIGN PATENT DOCUMENTS

JP         04-101801      *  4/1992  .................. 144/346

* cited by examiner

Primary Examiner—Deborah Jones
Assistant Examiner—Arden Sperty
(74) Attorney, Agent, or Firm—Venable LLP; Marina V. Schneller

(57) ABSTRACT

A method for producing decorative panels for use in vehicle interiors. A layer 3 of plant components, such as leaves 6, is glued onto a base layer 2, formed of superposed layers of sized paper and blank veneer sheets disposed on a metal or plastic carrier 1, whose shape allows it to be mounted to dashboards and/or the side panels of the interior. A transparent varnish layer 4 is then applied to the layer of plant components.

8 Claims, 1 Drawing Sheet

METHOD FOR PRODUCING DECORATIVE PANELS FOR USE IN VEHICLE INTERIORS, AND DECORATIVE PANEL

BACKGROUND OF THE INVENTION

The invention relates to a method for producing decorative panels for use in vehicle interiors, and decorative panels produced in accordance with the method.

Decorative panels are known in numerous embodiments as automobile interior appointments. They serve as trim, and are primarily mounted in the region of the dashboard and doors. In more expensive motor vehicles, these decorative panels are often produced from high-quality precious woods, whose unusual grain lends the interior a particularly attractive, luxurious appearance. Decorative panels comprising plastics and having printed, engraved or pressed-on simulations on the surface are considerably less expensive. These simple, plastic decorative panels, however, are not nearly as impressive as real wood or even root timber.

It is the object of the invention to disclose a method for producing decorative panels for vehicle interiors, particularly automobiles, whose surface creates a high-quality, nearly natural impression for the viewer, despite being produced at far lower costs.

SUMMARY OF THE INVENTION

For accomplishing the object, the method employs the use of plant components, particularly leaves of deciduous trees and bushes, as well as grass, straw, flowers, seaweed, algae, moss, pine needles, tobacco, etc. It has been seen that the visual effect of these materials for the viewer closely approaches that of grained precious woods, or can even surpass it. This always appears to be the case in the use of special plant components, such as leaves, flowers or other components of rare or exotic plants.

In accordance with the invention, the following procedure is performed for producing decorative panels: After the plants have been selected, components thereof are dried and flattened, for example through pressing or with rollers. Afterward, the components are conditioned until they possess a specific moisture content, and are then processed at this defined climate. A base layer created from sized paper and blank veneer sheets is applied to a carrier comprising metal or plastic; the plant components are then secured to the base layer. The surface of the decorative panels containing the plant components is then covered with a transparent varnish, then ground and polished. The decorative panels produced in this manner have an unusual, attractive appearance, yet are far less expensive than decorative panels produced from precious woods.

The plant components are advantageously flattened through pressing. This assures gentle treatment of the sensitive components.

The plant components are advantageously conditioned to have a residual moisture content between 70 and 95 percent. This lends the components a sufficient stability for further processing.

The base layer applied to the carrier is advantageously produced from a plurality of superposed layers of sized paper and blank veneer sheets. The flexibility of this base layer allows the plant components, which vary in thickness, to be embedded into its surface.

The applied plant components are advantageously secured to the base layer of the carrier with a liquid adhesive.

A transparent varnish layer comprising polyester is advantageously applied to the secured plant components, then dried. The treatment with polyester varnish offers the plant components reliable protection against mechanical influences.

In a preferred modification of the invention, highly sensitive plant components can be laminated onto a non-woven fabric prior to being applied to the base layer. This non-woven fabric can then be inserted, with the laminated plant components, into the tool of a plastic-injection machine, and plastic is injected onto the non-woven fabric.

The proposed decorative panel for use in vehicle interiors is distinguished by the fact that a base layer comprising a plurality of alternating, superposed layers of sized paper and blank veneer sheets is placed onto a carrier, and dried, flattened plant components are glued onto this base layer, and a transparent varnish layer is applied to the plant components.

The invention is described below by way of an exemplary embodiment illustrated in the drawing.

DETAILED DESCRIPTION OF THE INVENTION

Figure 1:
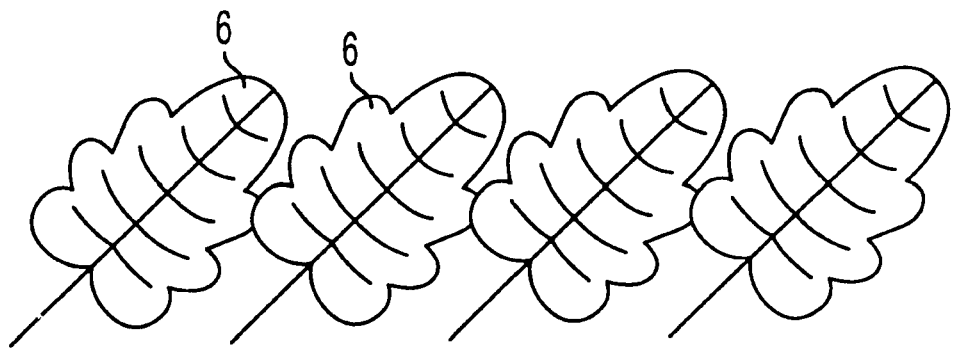
FIG. 1 is a top view showing an example of plant components for use in the invention.
Figure 2:
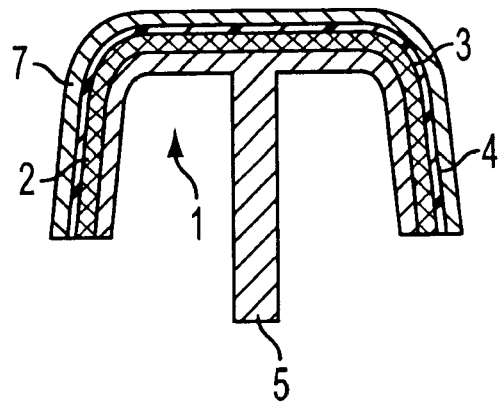
FIG. 2 is a cross-sectional view of a panel according to the invention.

The decorative panel used in the interior of vehicles, particularly automobiles, comprises a carrier 1, a base layer 2, a layer 3 of plant components, and a varnish layer 4.

The carrier 1, which has a T-shaped cross-section, comprises an aluminum sheen, magnesium diecast or plastic. A base tab 5 serves to secure the carrier 1 in grooves (not shown) provided for the carrier in the automobile interior, for example, on the dashboard or a door-lining panel.

Disposed on the carrier 1 is a base layer 2 comprising alternating, superposed layers of sized paper and blank veneer sheets, which have been applied and secured to the carrier 1 by means of a hot press.

A layer 3 of dried, flattened plant components, such as leaves 6, is glued onto the base layer 2. The components can be arranged in a pattern, or randomly, next to or on top of one another, and glued onto the base layer 2 with a liquid adhesive.

A transparent varnish layer 7, comprising polyester or a varnish, e.g. DD varnish (a two component varnish of Desmodur and Desmophen), covers the glued-on plant components. The surface of this varnish layer 7 is ground and polished.

LIST OF REFERENCE CHARACTERS

1 Carrier
2 Base layer
3 Layer of plant components
4 Varnish layer
5 Base tab
6 Leaves
7 Varnish layer

What is claimed is:

1. A decorative panel for use in vehicle interiors, having: a carrier, a base layer comprising a plurality of superposed alternating layers of sized paper and blank veneer sheets disposed on the carrier; dried, flattened plant components glued onto an outer surface of the base layer; and a transparent varnish layer applied to an outer surface of the plant components.

2. The decorative panel according to claim 1, wherein the plant components are secured to the base layer by a liquid adhesive.

3. The decorative panel according to claim 1, wherein the transparent varnish layer is a polyester.

4. The decorative panel according to claim 1, wherein the plant components are laminated onto a non-woven fabric applied to the base layer.

5. The decorative panel according to claim 1, wherein the carrier has a T-shape in cross-section, and the base layer, the plant components and the varnish layer are disposed on an outer surface of the cross member of the T-shape.

6. The decorative panel according to claim 5, wherein the base layer, the plant components and the varnish layer cover the entire outer surface of the cross member of the T-shape.

7. The decorative panel according to claim 1, wherein the carrier is made of one of an aluminum sheet, a magnesium die-cast and plastic.

8. The decorative panel according to claim 1, wherein the varnish layer covers the entire outer surface of the plant components.

* * * * *